United States Patent
Bass et al.

[11] Patent Number: 6,137,797
[45] Date of Patent: *Oct. 24, 2000

[54] PROCESS DEFINITION FOR SOURCE ROUTE SWITCHING

[75] Inventors: Brian Mitchell Bass, Apex; Jack S. Chorpenning, Cary; Douglas R. Henderson, Raleigh; Edward Hau-Chun Ku, Cary; Kenneth H. Potter, Jr., Raleigh; Sidney B. Schrum, Jr., Durham; Michael Steven Siegel; Norman Clark Strole, both of Raleigh, all of N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/757,867

[22] Filed: Nov. 27, 1996

[51] Int. Cl.[7] .............................. H04J 12/28; H04J 12/46
[52] U.S. Cl. .......................... 370/392; 370/405; 370/423
[58] Field of Search ..................................... 370/389, 390,
370/400, 401, 402, 403, 404, 405, 406,
407, 465, 467, 470, 392, 422, 423, 424,
425; 395/200.75, 200.79, 200.8, 200.81,
200.82, 200.83; 709/245, 249, 250, 251,
252, 253

[56] References Cited

U.S. PATENT DOCUMENTS

| | | | |
|---|---|---|---|
| 5,136,580 | 8/1992 | Videlock et al. | 370/403 |
| 5,208,811 | 5/1993 | Kashio et al. | 370/401 |
| 5,251,213 | 10/1993 | Videlock et al. | 370/403 |
| 5,280,480 | 1/1994 | Pitt et al. | 370/256 |
| 5,327,431 | 7/1994 | Heske, III et al. | 370/403 |
| 5,448,565 | 9/1995 | Chang et al. | 370/402 |
| 5,570,466 | 10/1996 | Oechsle | 395/200.68 |
| 5,617,421 | 4/1997 | Chin et al. | 370/402 |
| 5,655,140 | 8/1997 | Haddock | 395/200.76 |
| 5,684,800 | 11/1997 | Dobbins et al. | 370/401 |

*Primary Examiner*—Chi H. Pham
*Assistant Examiner*—Kwang B Yao
*Attorney, Agent, or Firm*—Joscelyn G. Cockburn

[57] ABSTRACT

A device for interconnecting Local Area Networks (LANs) includes ports for attaching LAN segments and port modules for connecting the ports to a switch fabric. Each of the port modules include a mechanism which searches the Routing Information (RI) field of a Received frame to detect at least two Triplets (a minimum configuration for a LAN segment) indicating a Source path from an originator user and a Destination path to a destination user. The Triplet (single or in combination) is used to access a database (tables) which identifies the Port of Exit (POE) through which the frame is to be routed.

14 Claims, 13 Drawing Sheets

SD = STARTING DELIMITER
AC = ACCESS CONTROL
FC = FRAME CONTROL
DA = DESTINATION ADDR
RII = ROUTING INFORMATION INDICATOR
SA = SOURCE ADDR
RI = ROUTING INFORMATION
RT = ROUTING TYPE
LTH = LENGTH FIELD
D = DIRECTION BIT
LF = LARGEST FRAME
r = RESERVE
RC = ROUTE CONTROL
RD = ROUTE DESCRIPTOR

PROCESS DEFINITION FOR SOURCE ROUTE SWITCHING

BACKGROUND OF THE INVENTION

1. Field of the Invention

The invention relates to devices for interconnecting networks in general and, in particular, to the type of devices termed switches.

2. Prior Art

The use of devices for interconnecting communications networks are well known in the prior art. The devices are known by different names including gateways, bridges, hubs, routers, switches, etc. In spite of what they are called, these devices provide interconnection features which enable a device on one communications network, such as a LAN, to communicate with another device on another LAN. Examples of prior art interconnecting devices will now be described.

U.S. Pat. No. 5,088,090 discloses a bridge for interconnecting LANs. Based upon information contained in a frame header, the bridge uses Source Routing Technique or Transparent Bridging Technique to forward the frame from one LAN to another. The routing technique used in the bridge is dependent on the one used by the originating node. For example, if the originating node is a Source Routing Node, the bridge uses Source Routing Technique to forward the frame. Likewise, if the originating node is a transparent bridged node, the bridge uses Transparent Bridging Technique to forward the frame.

U.S. Pat. No. 5,280,480 describes a bridge for routing frames from Source Routing nodes or Transparent Bridging nodes. The patent uses Bridge Protocol Data Unit (BPDU) Frame to set the bridge in a forwarding or blocking state and uses information in the header of Non-BPDU frames to forward the frames using the Source Routing technique or Transparent Bridging technique.

Even though the above bridge devices work well for their intended purposes, they are basically two port devices and offer limited interconnecting options. Arguably, several bridges can be configured to form complex networks of interconnected LANs. However, such networks are usually costly, difficult to configure and difficult to manage.

In addition, it is believed that as LANs become more congested (due to network expansion, attachment of higher speed devices, etc.), there is a need to provide faster and more efficient interconnecting devices.

U.S. Pat. No. 5,274,631 describes a switching system for interconnecting ethernet LANs. Each of the ports are connected through a packet processor to a switch fabric. A system processor is also connected to the switch fabric. When a packet processor receives a packet from the port to which it is connected and if the packet processor knows the destination port, the packet is routed through the switch fabric to the port. If the destination port is unknown to the packet processor, the packet is routed through the switch fabric to the system processor to identify the destination port. In this switching system, routing is done based on the destination addresses. As a consequence, large look-up tables correlating addresses with ports are required at each port. In addition, this switch can only be used to interconnect ethernet LANs. Therefore, there is a need for a switching system to interconnect Token Ring LANs. The present invention described below provides such a switching system.

Other IEEE documents including 8802-S and P802.5R describe devices in which the port determination is made at different functional units within the system. These devices use multiple look-up tables and multiple process, steps to select ports through which a frame is to be routed.

SUMMARY OF THE INVENTION

It is one object of the present invention to provide a more efficient switching system than was heretofore been possible.

It is another object of the present invention to provide a switch system for interconnecting Token Ring LANs.

It is another object of the present invention to provide a switching system which forwards frames based upon the information in the Routing Information Field (RIF).

It is another object of the present invention to provide a device that will facilitate the forwarding of frames via an internal switch fabric to a unique destination port based upon both the RIF and the MAC address when applicable.

It is still another object of the present invention to reduce the number of look-up tables and number of steps used in identifying the Port of Exit for a frame. These and other objects are achieved by using the Triplet (LID-BN-LID) to make Port of Exit decisions; therefore, facilitating the merging of the bridging and switching functions into a simple state machine and look-up tables.

The present invention provides a port module, at each port of the switch system, for filtering or forwarding frames. On receiving a frame from a LAN segment, the port module examines the Routing Information Indicator (RII) bit to determine its state. If the bit is set to "0", the frame has no Routing Information (RI) Field and the filtering and forwarding decision is based upon the Medium Access Control (MAC) Address in the frame.

If the frame has an RI field, the RII bit is set to a "1", the filtering and forwarding decisions may be based upon the information in the RI field or the MAC address. The Filtering Mechanism, a part of the port module, parses the RI Field to detect if an internal source route bridge path (e.g., internal to this switch) and/or if a known external source route bridge path (e.g., external to this switch) is indicated. A so-called Path Triplet is formed that can be used by the switch logic at the receiving port to identify the destination port to which the frame is to be forwarded. The Path Triplet is expressed as "LAN ID" (Identification)—Bridge Number—LAN ID. The notation L0-B0-L1 is used to represent the Path Triplet. The first LAN ID, L0, of the Path Triplet identifies the LAN Segment or Ring Number assigned to the switch port that receives the frame. Likewise, the second LAN ID, L1, of the Path Triplet is used to identify the destination LAN Segment (Ring Number), and thus the destination switch port, to reach the destination station.

The Path Triplet uniquely identifies a Source Route Bridge Path between the two LAN IDs, L0 and L1. If the switch logic of the receiving port determines that the Path Triplet indicates a source route bridge path that is external to the switch and local to the receiving port, the frame is discarded. If the switch logic of the receiving port determines that this source route bridge path is internal to the switch, then a second, overlapping Path Triplet, if present, is formed beginning with the second LAN ID (L1) of the original Path Triplet. The new Path Triplet is designated L1-B1-L2 that identifies a source route bridge path that is external to the switch. This unique sequence is used by the source switch port logic to uniquely identify the target port to reach the destination station.

In particular, the filtering mechanism, in each port module, scans the RI field to detect a LAN ID (LID) matching the LID of the ring to which the port is connected. The LID of the ring is stored in the Port LID/Register in the Associated Port Module. If a matching LID is found, it is referred to as "L0" and all other Triplets (LAN ID-Bridge Number-LAN ID) are referenced relative to L0. The numbers associated with a LAN ID-Bridge Number-LAN ID indicate the relative position of the LAN ID Bridge in the Route. By noting the position of L0 in the routing information field, the Route Descriptor is determined and is used to identify the port to which the frame is to be routed.

The switch port logic determines if the Path Triplet, L0-B0-L1, identifies the internal source route bridge path. If not, then the B0-L1 Destination Route Descriptor identifies a Source Route Bridge path that is external to the switch and uniquely identifies the next hop for the frame to traverse. If the indicated Destination Route Descriptor is local to the source switch port (e.g., the identified Source Route Bridge path, B0-L1, is on the same ring, L0, as the receiving switch port), then the frame can be discarded (i.e., filtered) by the switch port logic. If the Destination Route Descriptor hop is not local to the source port, then B0-L1 Destination Route Descriptor is used to identify the target port based on a matching entry of known external source route bridge paths within the switch port address table.

When the Path Triplet identifies the internal source route bridge path, the LAN ID, L1, will uniquely identify the destination port if there is only one port associated with that LAN ID. However, the switch architecture allows more than one port to share the same LAN ID. In this case, an external source route bridge path, if present, is identified in the Path Triplet, L1-B1-L2. The B1-L2 Destination Route Descriptor is unique for a given source route bridge path between ring L1 and ring L2 and can be used to identify the target port via the source port's look-up table of known external source route bridge paths. The look-up table within each port is maintained by the central switch processor. Two types of records are maintained; namely, Address Record and External Bridge Record. The look-up table is unique for each port and contains the following information:

A 6-byte address for each station accessible on this port

A 2-byte Bridge Number—LAN ID for each Source Route Bridge accessible on this port A 6-byte address for each remote station accessible via another port of this switch, along with the target Port of Exit (POE) tag A 2-byte Bridge Number—LAN ID for each remote Source Route Bridge accessible via another port of this switch, along with the target POE tag MAC Addresses and Route Descriptor information are "learned" by the central processor and stored in both the master and port(s) address tables. These tables are periodically checked to remove entries that are deemed to be inactive (aging).

In one feature of the invention, the order of the Path Triplet is reversed. For example, after parsing, the Path Triplet reads L0-B1-L1, the reordered Path Triplet is L1-B1-L0. By reordering the Path Triplet and using it to perform the look-up in the filter table, the filtering is done in one direction only (i.e., away from the switch). As a consequence, port identification is done much faster and easier.

DETAILED DESCRIPTION OF THE PREFERRED EMBODIMENT

Figure 1:
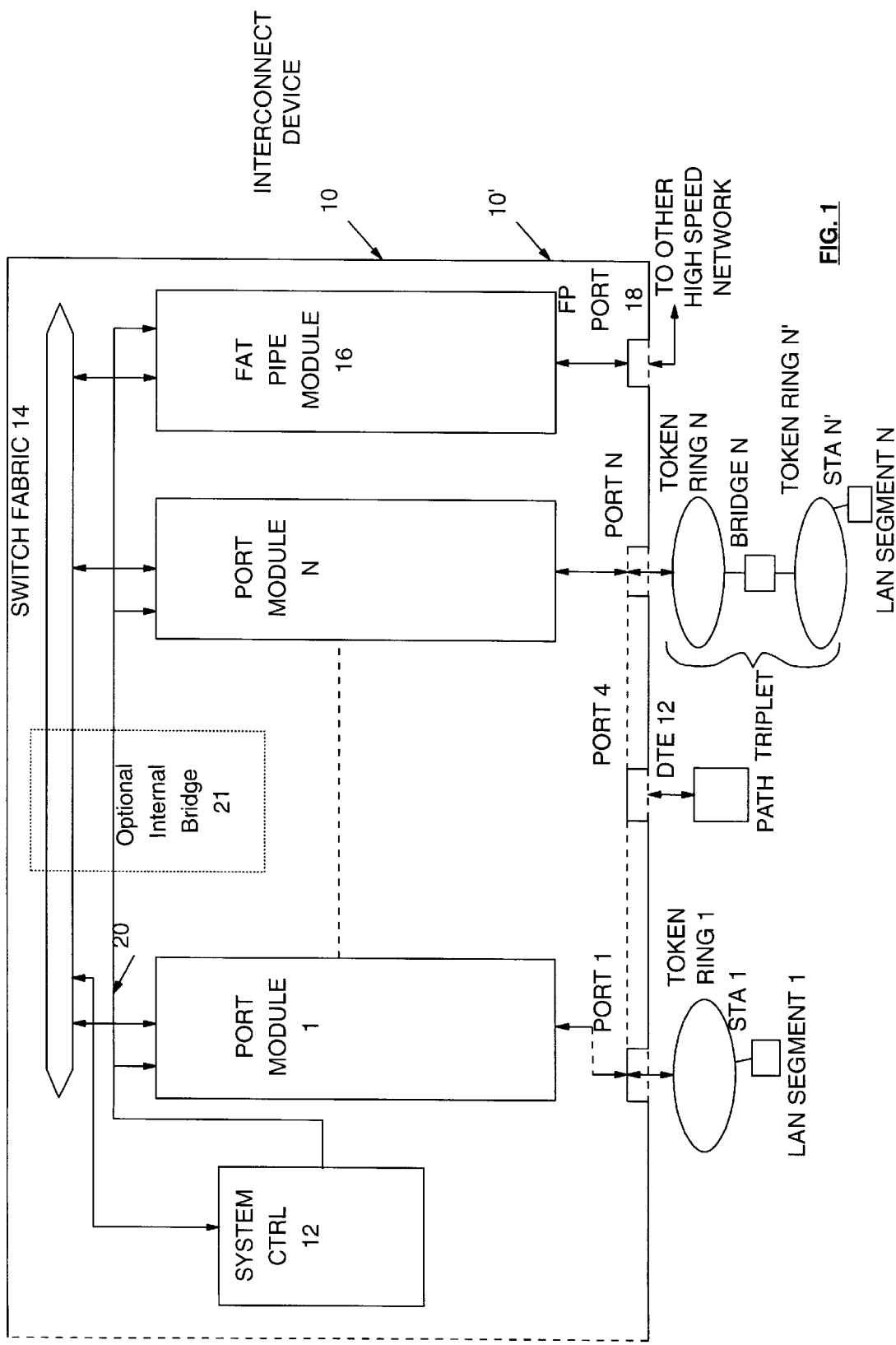
FIG. 1 shows a block diagram of a communications networks and the interconnecting device.

FIG. 1 shows a communications network comprising a plurality of LAN Segments 1 through N interconnected by an Interconnecting Device 10, which is referred to as a Token Ring LAN Switch. As used in this application, a Switch or Switch System refers to an interconnecting device in which a switching fabric is used to couple the ports.

Both Transparent and Source Route Bridge Paths are used to couple ports. An Internal Bridge Device 21, when present, provides a Source Route Bridge Path between two or more ports. Both the Internal Bridge Path and the External Bridge Paths are represented by the sequence LAN ID—Bridge Number—LAN ID. This sequence is referred to as the "Path Triplet" in this invention. It should be noted that this illustration does not encompass all of the configuration options that are possible or that are supported by the switch device. It should be noted that rings on different ports may be assigned the same ring or LAN segment number. This is typical of a switch device and is a differentiating feature from current bridge devices. Limitations in bridges require that Source Route (SR) bridges have different ring numbers assigned to each port. Further, where the topology supports multiple bridges connected between rings, the bridge numbers must be unique.

The Interconnecting Device 10 illustrated supports both LAN segments and single data terminal equipments, only one is shown as DTE 12, connected to individual ports. A port of the switch labelled 'Fat Pipe (FP)' is connected to other high speed networks.

Still referring to FIG. 1, the Interconnecting Device 10 includes a Housing 10', a plurality of ports (Port 1 through Port N), a plurality of port modules (1 through N), a System Controller 12, and a Switch Fabric 14. The ports are connected to the housing and include electrical connectors (not shown) which coact with external connector to connect a LAN Segment, a DTE or a high speed network to the Switch. Each port is connected by a Port Module to the Switch Fabric 14. The Port Module (details to be given subsequently) is itself a contained unit and provides all of the electrical components for routing a Token Ring frame received on one port to a station located on another port of Device 10 via the Switch Fabric 14. The Fat Pipe Module 16 provides the interconnection between the Fat Pipe Port 18 and the Switch Fabric 14. The System Controller 12 provides the necessary management and control functions for the overall Switching System. A System Control Bus 20 couples the System Controller 12, the Switch Fabric 14, and each of the Port Modules and Fat Pipe module. The Switch Fabric 14 provides the switching function between the respective modules. Its structure could be a simple high speed bus to a more complex multi-point switching module.

Figure 2:
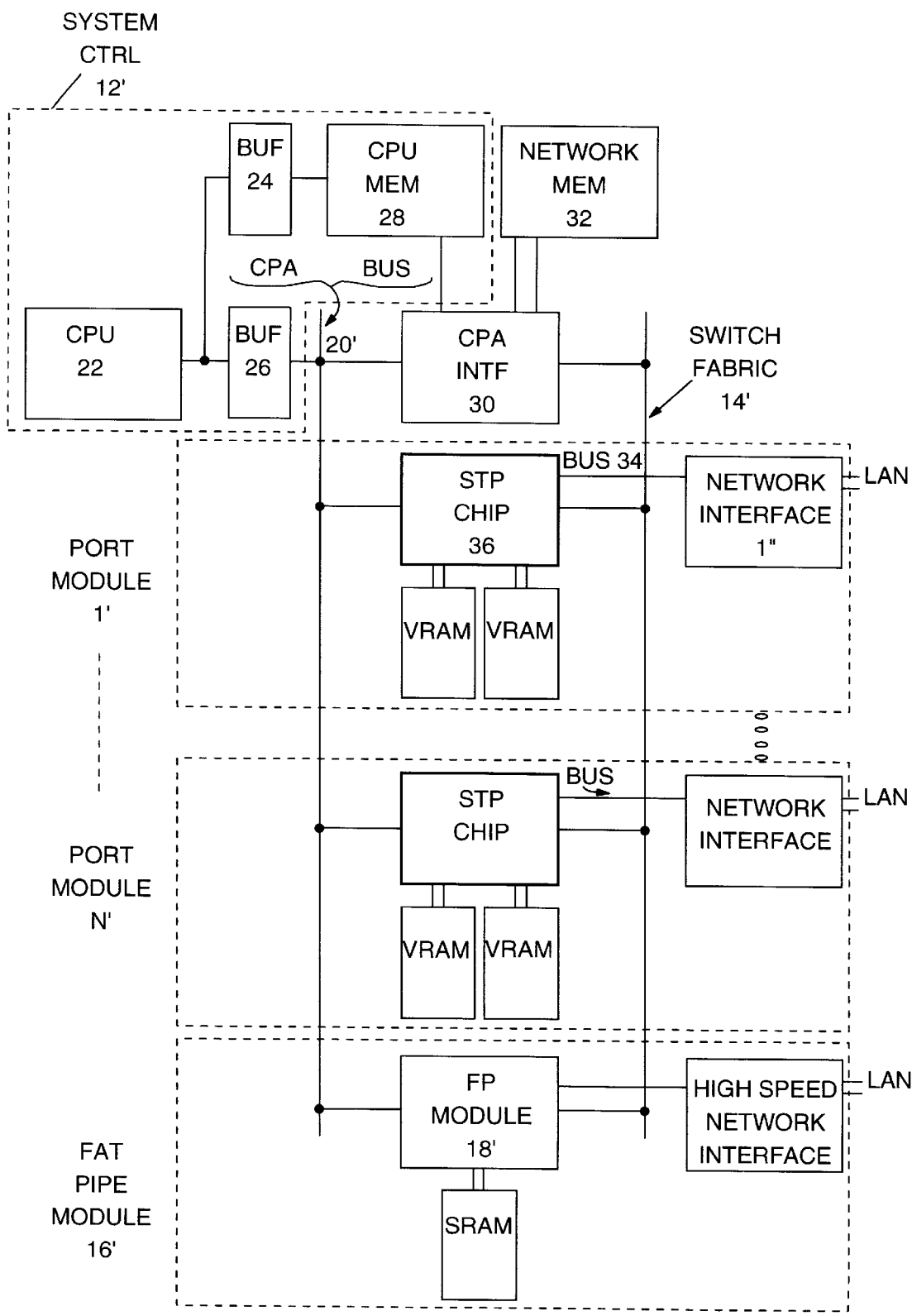
FIG. 2 shows a detailed block diagram of the interconnecting device according to the teachings of the present invention.

FIG. 2 shows a block diagram of the Switch System according to the teachings of the present invention. Components in FIG. 2 that correspond to components in FIG. 1 are identified with common numerals with a prime (') indicating that it is in a different figure. The System Controller 12' includes CPU 22, Buffer 24, Buffer 26, and CPU Memory 28. The Buffers 24 and 26 are connected to the CPU Bus 20' and the CPU Memory 28 is connected to Buffer 24. As stated before, the System Controller 12' is the Switch Level Processor. Its major functions are filter management, statistic gathering/reporting and initialization of the switch hardware and software. The CPA INTF 30 is the memory manager which manages CPU Memory 28 and the Network Memory 32. The Network Memory 32 stores frames to be sent to and received from the Switch Fabric 14'.

Still referring to FIG. 2, the port modules 1' through N' are identical. Therefore, only one will be described, it being understood that this description is intended to cover all of the port modules. The Port Module (for example, 1') includes a Network Interface (such as 1") connected by a Bus 34 to Source Routing Token Ring Port (STP) Chip such as 36. A pair of the Video Random Access Memory (VRAM) are connected to the STP Chip. The STP Chip is connected to the Switch Fabric 14'. The network interface includes the appropriate connection for connecting to a Token Ring LAN. In addition, the Network Interface provides the MAC level protocol for forwarding and receiving frames from a Token Ring LAN. In the Token Ring environment, the protocol is the IEEE 802.5 Token Ring protocol. The functions provided by the network interface are well known; therefore, further description will not be given. The STP Chip provides the filtering function that enables a Token Ring frame received at one port to be forwarded to another port of the Switching System. The VRAM provides storage function necessary to perform the filtering. The FP module 16' is connected to an SRAM. The function of the FP module 16' is to provide interconnection between a high speed LAN (such as 100 Mpbs FDDI or 155 Mbps ATM) and devices connected to other ports of the Switch System.

Figure 4:
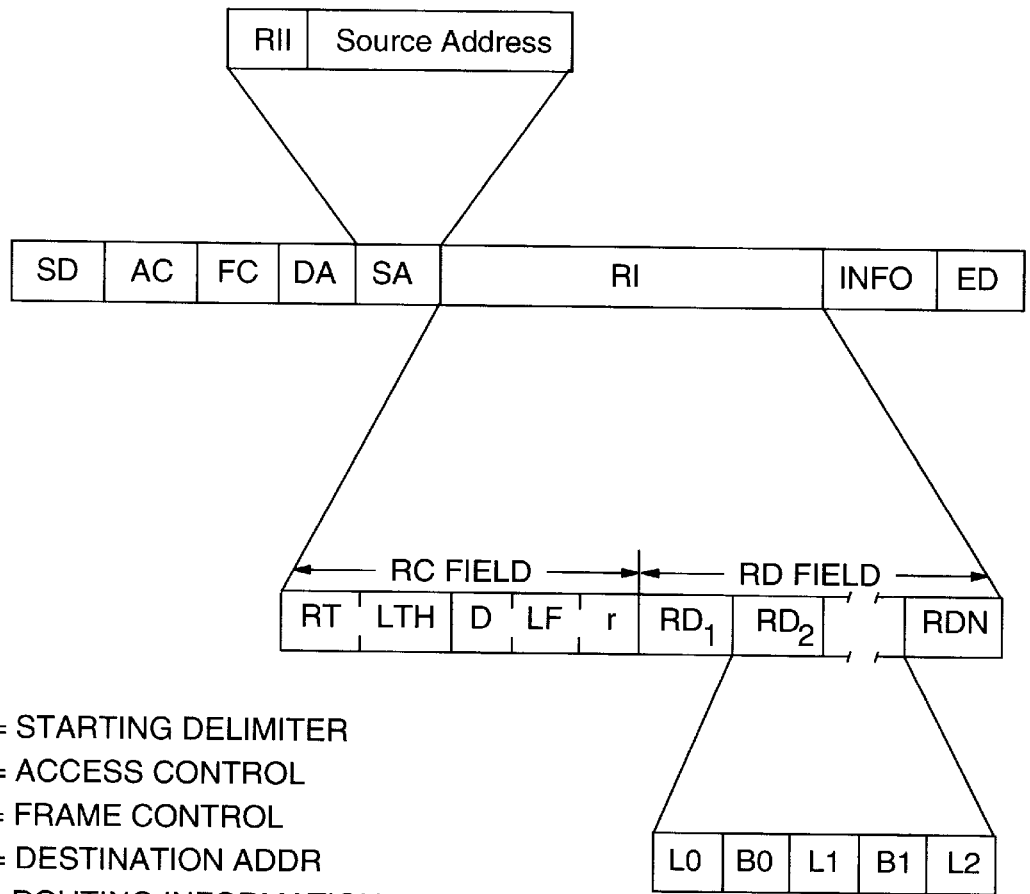
FIG. 4 shows a graphical representation of the Frame Format.

Turning to FIG. 4 for the moment, a graphical representation of the frame format which transports information within the Switch System is disclosed. The frame is structured in accordance with the teachings of the IEEE 802.5 standard for Token Ring. The frame includes a Start Delimiter (SD) field, an Access Control (AC) field, a Frame Control (FC) field, a Destination Address (DA) field, Source Address (SA) field, Routing Information RI Field (RIF), Information (INFO) field, and an End Delimiter (ED) field. The functions and purposes of the respective fields are well known in the communication art, therefore only those fields that are of immediate interest to the present invention will be described in detail. The first bit of the Source Address Field is termed Routing Information Indicator (RII) bit. The state of the bit indicates whether the frame has an RIF or not. If the bit is set to a logical "1", there is an RIF in the frame. Likewise, if the bit is set for logical "0", there is no RIF in the frame. The RII bit is set by the Source Station.

Still referring to FIG. 4, the RIF has a Routing Control (RC) field and a Route Descriptor (RD) field. The purpose of the RIF is to route a frame throughout the network. To this end, the RC field has a Routing Type (RT) subfield which is used to indicate the frame type. For example, if RT is set to "10X" B, it is an All Routes Explorer (ARE) frame. Likewise, if RT is set to "11X" B, it is a Spanning Tree Explorer (STE) frame. The decision which is made in routing each of the frames through the switch depends on the frame type. The LTH subfield is the length field and indicates the length of an RIF. The D subfield represents the direction, and depending on its setting, tells the direction in which the RIF is examined. The LF subfield is provided with information and represents the largest frame supported by the end-to-end path. The r represents a Reserve bit. Finally, the RD1, RD2 . . . RDN represent the route descriptors that are inserted in the frame by the source route bridges that comprise the path. The protocol that determines the RIF used by stations is known. As pointed out above, the Route Descriptors are structured in the sequence of LAN ID-Bridge Number-LAN ID. The sequence LAN ID-Bridge Number-LAN ID is termed a "Path Triplet". It should be noted that LAN ID and Ring Number are used synonymously. As will be described in more detail below, each Source Routing Token Ring Port (STP) Chip on receiving frames, determines if the frame has a Routing Information field by examining the state of the RII bit. If the RII bit is set to "0", the Chip concludes there is no RI field and the frame is routed based upon the MAC Address information in it. If the RII bit is set for "1", the frame has a routing information field structured in the TRIPLET sequence, as set forth above, and the STP Chip parses the RD subfield to extract the Path Triplet which are used to access filter tables (to be discussed subsequently) in the VRAM to determine the port of exit (POE) to which the frame is to be routed. As stated above, if the frame has no RI field, then the look-up function is done based upon the MAC address. This is a straight forward table look-up which will not be discussed further.

Figure 3:
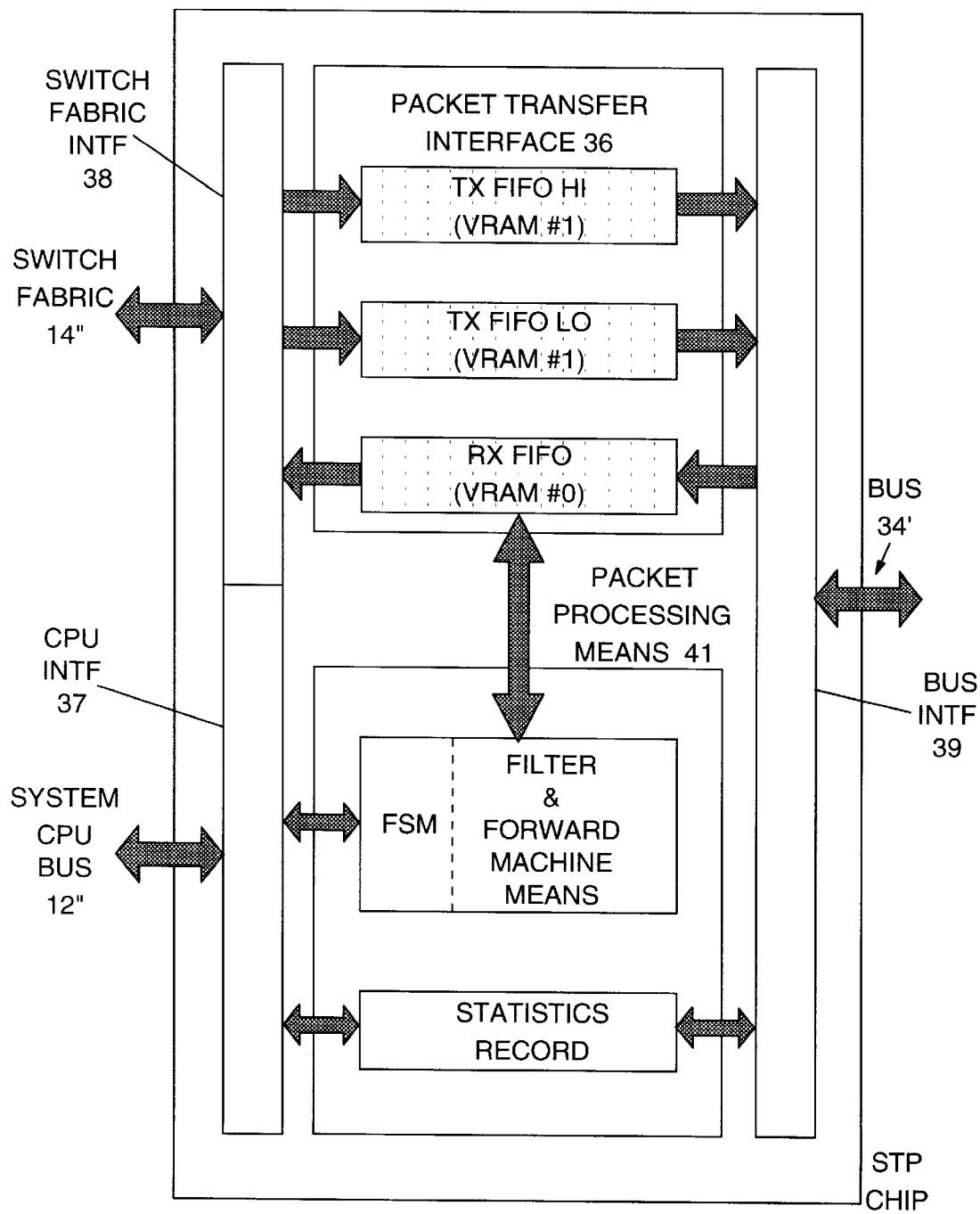
FIG. 3 shows a block diagram of Source Routing Token Ring Port Chip (STP CHIP).

FIG. 3 shows a block diagram of the STP Chip. As pointed out above, the STP Chips in the switch are identical and description of one is intended to cover description of all. The STP Chip is positioned in each of the port modules and performs the filtering and forwarding functions that moves a frame from one port to another or discards the frame. The STP Chip is connected between the System CPU Bus 12", the Switch Fabric 14' and the Bus 34' connecting the STP Chip to the network card. The STP Chip includes a Packet Transfer Interface 36 including TX (Transmit) FIFOs (VRAM #1) and RX (Receive) FIFO VRAM #0. The respective VRAMs are coupled through a Switch Fabric Interface (INTF) 38 to the Switch Fabric 14". The TX FIFOs are connected by independent bus to the Bus Interface 39 which is connected to Bus 34'. The receive FIFO receives frames coming in from the port to which it is connected. A Received frame, after processing by the Filter and Forward Machine Means (details to be given subsequently) in the Packet Processing Means 41 of the STP Chip, is passed to the Switch Fabric 14" via the Switch Fabric Interface 38. Likewise, frames from the switch fabric are passed through the Switch Fabric Interface 38 to VRAM 1 and then to the Bus Interface 39 to the associated port via Bus 34. Still referring to FIG. 3, the Filter and Forward Machine Means includes a Frame Filter Means, a Frame Routing Means and Local Access Port Record. A Statistic Record retention device is also provided in the STP Chip. The Frame Routing Means and the Frame Filter Means form an imbedded Function State Machine Means (FSM) which is in each of the port modules and performs the filter/forward function described by this invention. The local access port record includes a Port ID that identifies the port, Ring Number that identifies the ring connected to the port, and other statistical information for the port. The Function State Machine Means are key elements in the port for parsing the frame to determine if a frame should be discarded or forwarded, and if forwarded, the Port of Exit (POE) that a received frame is to be sent. Statistical information are extracted and stored in the Statistical Record which is maintained in VRAM.

If the frame is to be discarded, the FFSM Means will move from state 206 to state 220 (Discard). Once the frame is discarded, the FFSM Means will move to the Idle state (200) and wait for the next frame.

TABLE 1

| RII = 1 | RC Invalid | RI Invalid | RI Length = 2 | L0 Found | L0 Last | B0 = Bridge Number | Dest ELID = Port ELID | L1 Last | L0 First | Action |
|---|---|---|---|---|---|---|---|---|---|---|
| 0 | — | — | — | — | — | — | — | — | — | Use DA & SA |
| 1 | 1 | — | — | — | — | — | — | — | — | Discard Frame |
| 1 | 0 | 1 | — | — | — | — | — | — | — | Discard Frame |
| 1 | 0 | 0 | 1 | — | — | — | — | — | — | Use DA & SA |
| 1 | 0 | 0 | 0 | 0 | — | — | — | — | — | Discard Frame |
| 1 | 0 | 0 | 0 | 1 | 1 | — | — | — | — | Use DA & SEB |
| 1 | 0 | 0 | 0 | 1 | 0 | 0 | — | — | 0 | Use DA & SEB |
| 1 | 0 | 0 | 0 | 1 | 0 | 0 | — | — | 1 | Use DA & SA |
| 1 | 0 | 0 | 0 | 1 | 0 | 1 | 1 | — | 0 | Use DA & SEB |
| 1 | 0 | 0 | 0 | 1 | 0 | 1 | 1 | — | 1 | Use DA & SA |
| 1 | 0 | 0 | 0 | 1 | 0 | 1 | 0 | 0 | 0 | Use DEB & SEB |
| 1 | 0 | 0 | 0 | 1 | 0 | 1 | 0 | 0 | 1 | Use DEB & SA |
| 1 | 0 | 0 | 0 | 1 | 0 | 1 | 0 | 1 | 0 | Use DA & SEB |
| 1 | 0 | 0 | 0 | 1 | 0 | 1 | 0 | 1 | 1 | Use DA & SA |

KEY:
DA = Destination Address
SA = Source Address
DEB = Destination External Bridge (using triplet)
SEB = Source External Bridge (using triplet)

The STP Function State Machine means performs four basic functions: it filters (discards) those frames that do not need to traverse the switch to reach the destination path or station; it determines the Port of Exit (POE) for a frame received from the port to which it is connected; it places a Switch Control Header in each frame received so that the frame can be routed to the specific POE to which a destination station is connected; and it updates the statistics associated with the frame.

Figure 5:
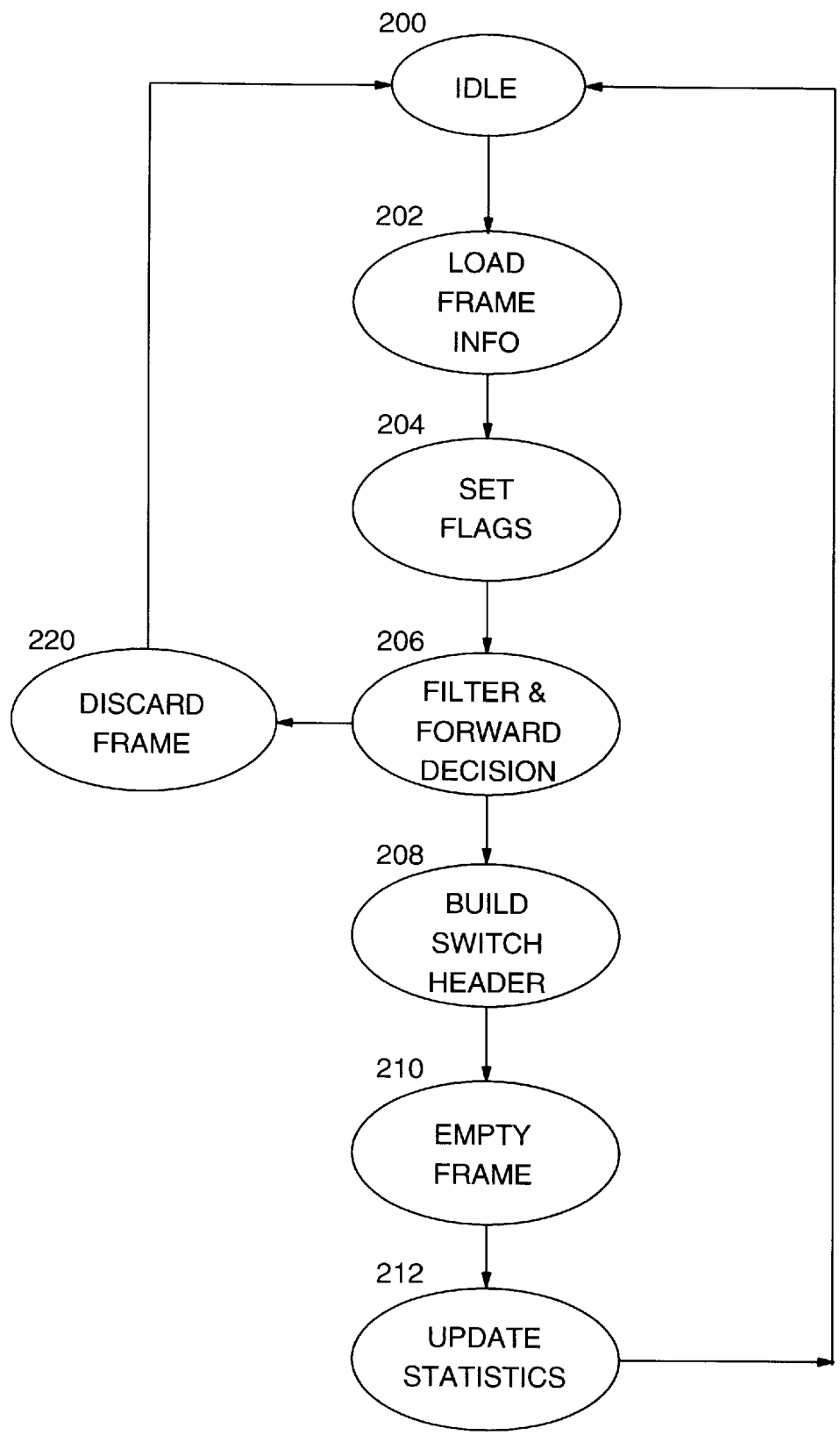
FIG. 5 shows block diagram of the Filter State Machine (FSM).

FIG. 5 shows the logic for the Filter/Forward State Machine (FFSM) means which is used to make the decision to either forward the frame through the switch or discard the frame. State 200 is the state used to wait for a frame to arrive at this port. Once a frame arrives, the Filter/Forward State Machine moves to the Load Frame Info state (202). In this state, the FFSM Means loads the necessary information from the frame in order to make the correct filter or forward decision. After the necessary amount of information has been loaded, the FFSM Means moves to the Set Flags (204) state in order to set all the flags needed to make the correct decision. The FFSM Means then transitions to state 206 and examines the flags set during state 204 and makes the appropriate filter or forward decision. Normally, if the frame is invalid, or the destination is local to the receiving port, the frame will be discarded. When the destination is through the switch, the FFSM Means will determine to which port to send the frame.

Still referring to FIG. 5, if the frame is to be forwarded through the switch, the FFSM Means will move to the 208 state and build the appropriate header in order to forward the frame. Once the header has been constructed, the frame will be emptied from the FFSM (state 210) and sent to the appropriate switch port in order to get to the destination. Once the frame has left the port, the FFSM Means will update the necessary statistics (state 212) for the frame and then return to Idle (state 200).

Table 1 shows how the FFSM Means determines which portion of the frame to use for the switch header (POE) lookup. If the frame is not to be discarded, the FFSM Means uses either the Destination Address (DA) of the frame or the Destination External Bridge (DEB) as determined from the algorithm's (described hereinafter) setting of appropriate flags and the Table 1. Once the appropriate destination record is determined, the FFSM Means uses the table to determine which source record to use.

If the table states that the SA is to be used, then the Source Address record is used as part of the lookup function. If the table states that the SEB should be used, then the FFSM Means uses the Source External Bridge (preceding triplet with L0 being at the end) as the source record. Using these two records, the FFSM Means can determine exactly which switch port should receive the frame.

The STP Mechanism includes Function State Machines and logic to control the Function State Machines. The flowchart which describes the detail function of the Filtering Machine will be described next.

The process used in the Filtering Machine to discard or forward a frame will now be described. First, an overall description of the process will be given, followed by a detailed description with flowcharts identifying detailed steps of the process. The process initially characterizes the frame that has been received from a LAN segment by examining the Routing Information Field (RIF) if it is present in the frame as indicated by Routing Information Indicator (RII) bit of the Source Address Field. If present, the RIF must be parsed to determine if the receiving port should forward or discard the frame. This parsing process also produces a result that is then used to establish the target port for the frame if it is to be forwarded.

The major steps of the Process are as follow:

1. Is the Frame Source routed? Determine by testing the RII bit (high-order bit in Source Address field). If RII=1 then Go To Step 2. If RII=0, then Exit.

2. Test for valid Routing Information Field (RIF). This is determined by testing the RC length and RI broadcast indicators. (The details of the test are set forth below.) Set Frame RC Invalid Flag=1 if invalid. Continue.

3. Test for RIF length of 2 bytes. Set RIF Length Two Flag=1 if true. Continue.

4. Test for All Routes Explorer (ARE) frame. Set ARE Frame Flag=1 if true. Continue. Test for Spanning Tree Explorer (STE) frame. Set STE Frame Flag=1 if true. Continue.

Note: Either ARE or STE can be true. Both can be false.

5. If RIF Length Two Flag=0, then

5a. Scan Route Descriptor (RD) field for LAN ID (LID or LIN) match.

5b. Is LID the first field in the Route Descriptor?

5c. Is LID the last field in the Route Descriptor?

6. If LID is not last, then locate the Path Triplet to be used:

6.1 Locate the LID in the Route Descriptor field 6.2 Identify triplet as L0, B-0, L-1 where L0=LID (see Triplet mapping described herein)

6.3 Does B-0, L-1 identify an internal bridge hop (within this switch)?

a. if Yes, is L-1 the Last ring? If not, locate the next sequential path triplet which is found beginning with L1 and is identified as L1-B1-L2.

b. if no, then Continue.

7. Destination Search type is now determined.

IF

Route Descriptor contains LID, (5a)=Yes

LID is first, (5b)=No

There is no internal bridge hop, (6.3)=No

OR

IF

Route Descriptor contains LID, (5a)=Yes

LID is first, (5b)=Yes

There is an internal bridge hop, (6.3)=Yes

Is L-1 last? (6-3a.1)=No

THEN

A Destination Route Description search is performed using the

Destination Route Descriptor formed from the Path Triplet identified in (6).

ELSE

A Destination Address Search is performed based on the Destination

Address (DA) found in the frame.

FIGS. 6A through 6F show detailed flowcharts of the process. With respect to FIG. 6A, the process (termed Source Route-SR Parse) begins in block 40 and descends into block 42 where the first byte of the source address is read. The process then descends into block 44 where the Routing Information Indication (RII) bit is tested. The RII bit is the first bit in the first byte of the frame source address. If the frame RII bit is not=1, the process exits the Source Routing (SR) parse process block 46. If the frame RII bit is equal to 1, the process continues to block 48 where it sets the RII flag to a 1. The process reads the frame routing control field (52) and sets flags based on an examination of the RC. In particular, and with respect to FIG. 4:

IF(Frame RC length is 0, 4, or odd) OR (Frame RI Broadcast Indicator Bits='1xx'b AND Frame RI direction Bit=1)

THEN Frame RC Invalid Flag is set to <=1

IF(Frame RC Length=2)

THEN RI Field Length Two Flag is set to <=1

IF(Frame Broadcast Indicator Bits='10X'b)

Then ARE Frame Flag is set to <=1

IF(Frame Broadcast Indicator Bits='11X'b)

THEN STE Frame Flag is set to <=1

Figure 6A:
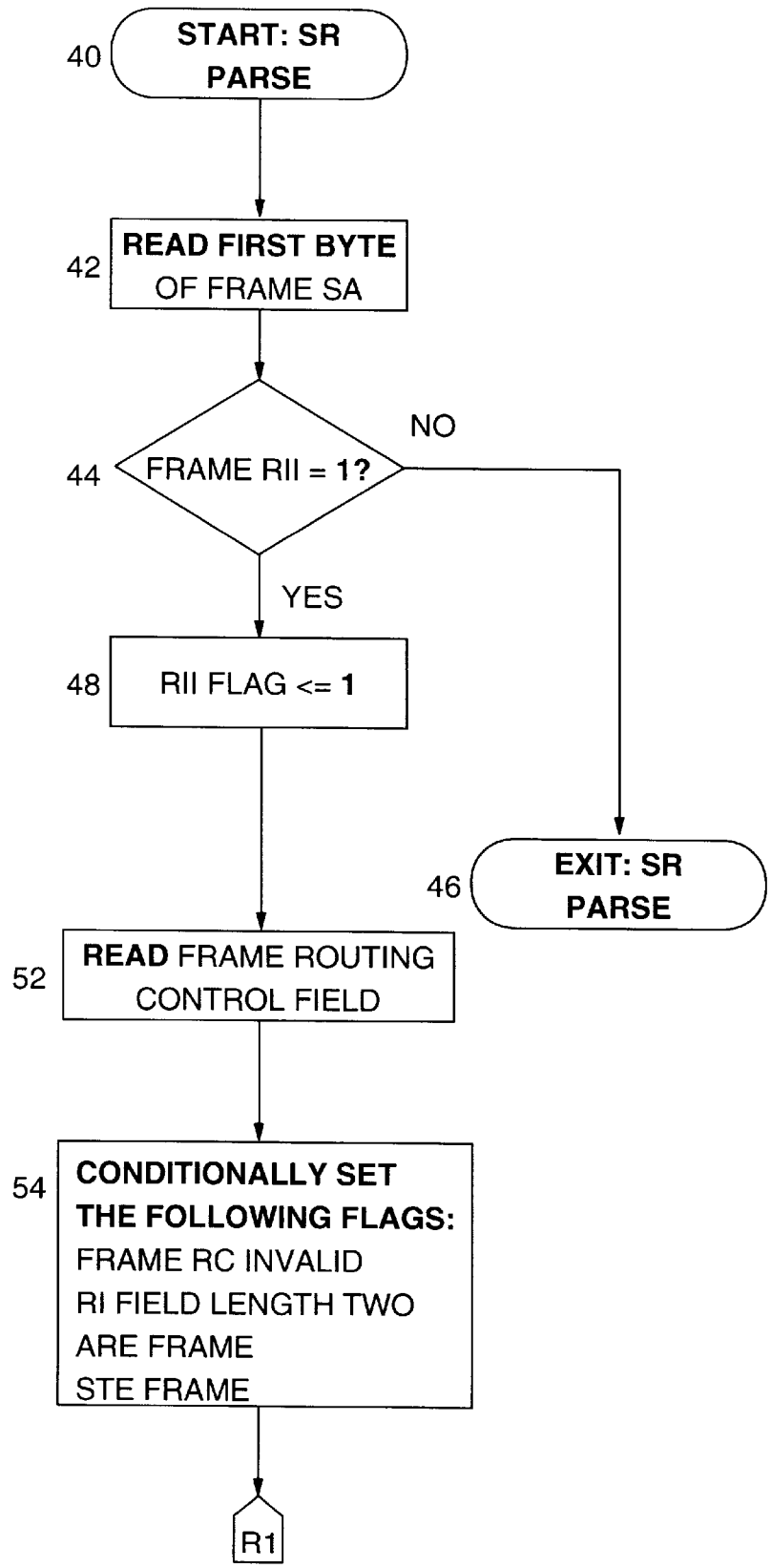
FIGS. 6A through 6F show flowcharts for the routing process according to the teachings of the present invention.
Figure 6B:
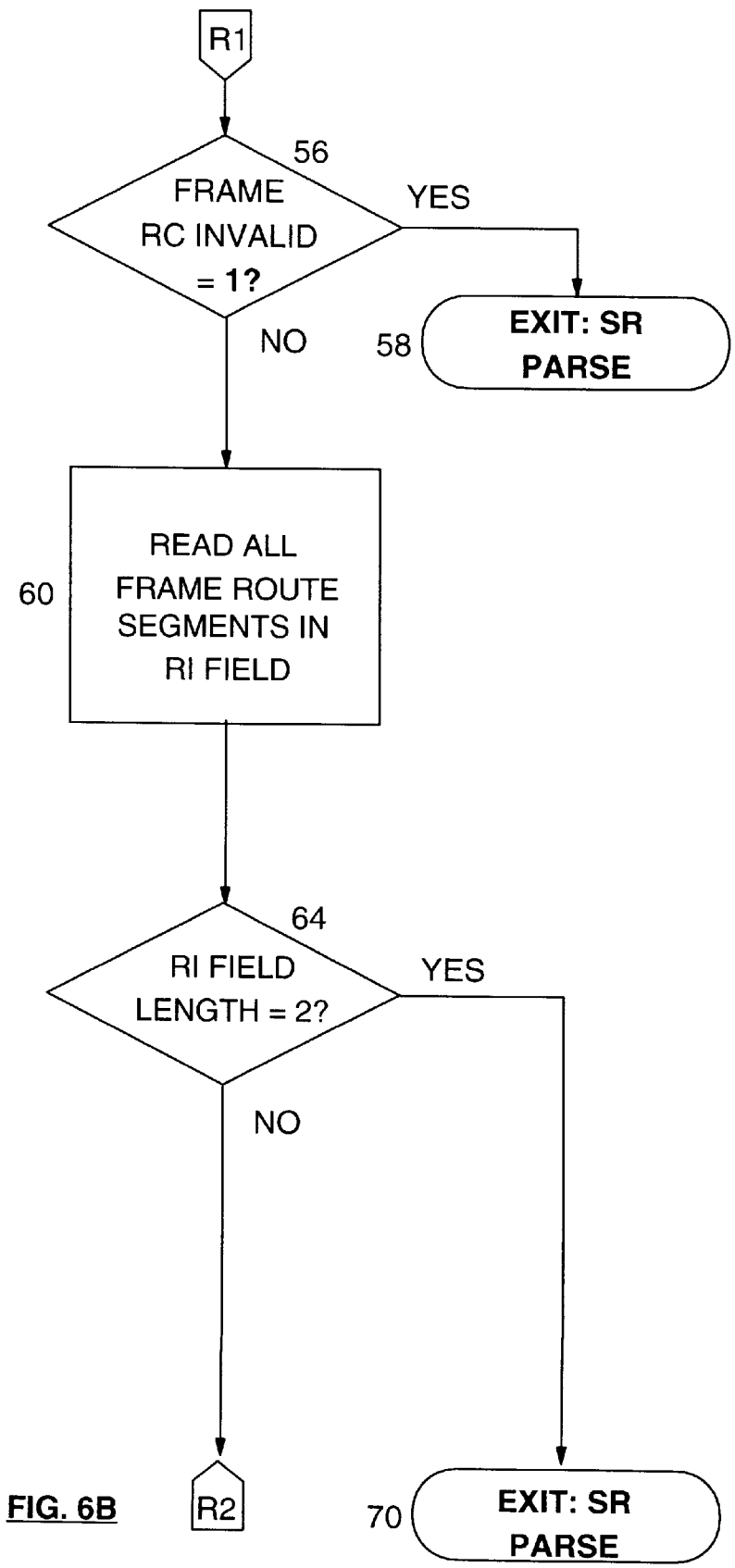

After the flags are set based on the above conditions, the process exits FIG. 6A at R1. Referring to FIG. 6B, the process continues from R1 to block 56. In block 56, the process checks to see if the Frame Routing Control Invalid flag is set to 1. If it is, this means the RC field is invalid and the program exits the process at block 58. The frame that was being parsed is then discarded. If the frame RC is not invalid, the process examines all the Frame Route Segments in the RIF. As stated previously, the Route Descriptors form a sequence of LID-Bridge Number-LID.

Still referring to FIG. 6B, and in particular block 64, it checks to see if the RI Field Length equals 2 bites. If it is, the process exits at block 70.

Figure 6C:
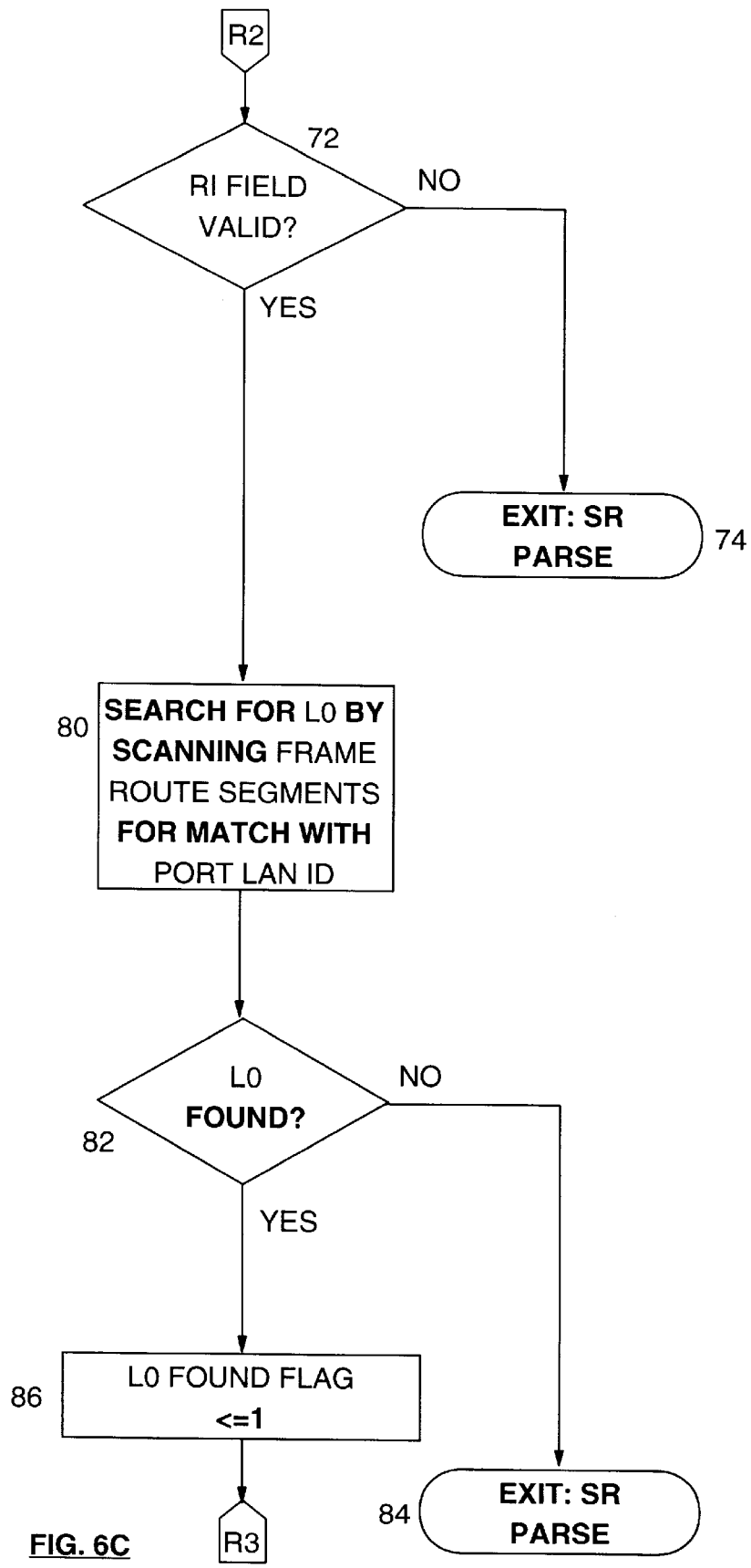

FIG. 6C shows that the process continues the parsing technique from R2 into block 72 where it checks to see if the frame RI field is valid. If valid, the process continues. If the RI field is invalid, the process exits at block 74. The received frame RIF is invalid if the (Frame Byte Count—18)<(Frame RI Length) or if duplicate LAN IDs are present. Usually, the frame is discarded if it is found that the RI field is invalid.

Still referring to FIG. 6C, from block 72 if the RI Field is valid, the process then descends into block 80 where it searches for L0 by scanning the Route Descriptors to match with Port LAN ID. It should be noted that L0 is the identification of the LAN which is connected to the port which receives the frame. It should be noted that several records with information about each port of the switch are stored in Port Registers. The ID of the ring connected to a port is one of the many records stored in the port. From block 80, the process descends into block 82. If L0, which is the ID for the LAN connected to the port is not found, the process exits block 84. In block 82, if L0 is found in the RI field, the process descends into block 86. The L0 Found Flag is set to a logical 1 and exits FIG. 6C, at R3.

Figure 6D:
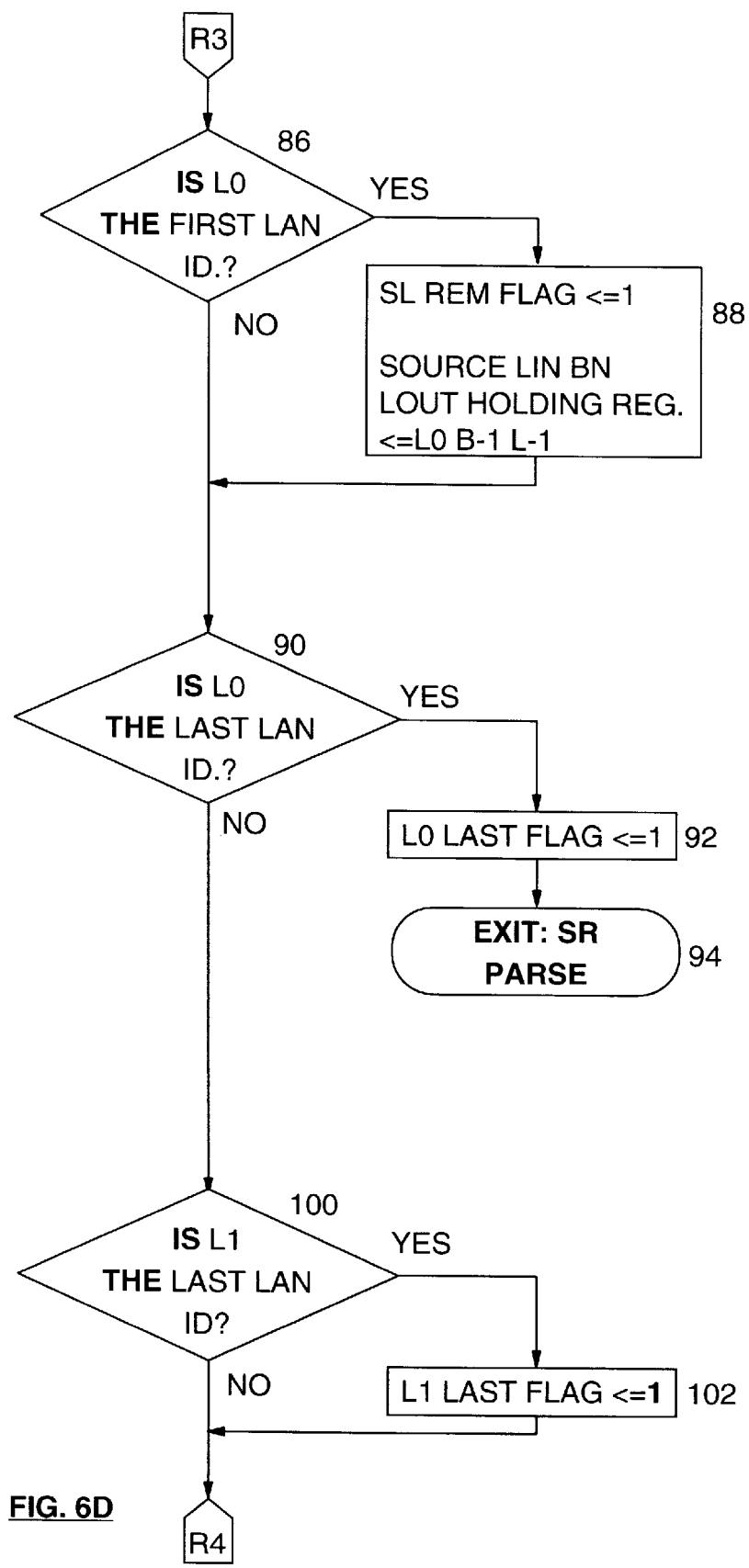

FIG. 6D shows a continuation of the Parsing Process beginning with block 86 where the process checks to see if L0 is the first LAN ID. If L0 is the first LAN ID, the process descends into block 88. In block 88, the process sets the SL Rem Flag to a 1 and the source LAN In Bridge Number LAN Holding Out Register is set to L0 B-1 L-1. In essence, in block 88 the Path Triplet is found and identified. The term first and last as used in FIG. 6D takes into consideration the setting of the Direction Bit (FIG. 4) and refers to the first or last LAN ID in the route. For example, if the Direction Bit is a "0", then the "first LAN ID" appears in the frame immediately after the Routing Control Field (See FIG. 4). If the Direction Bit is a "1", then the first LAN ID is at the end of the RI field.

Still referring to FIG. 6D, and in particular block 86, if L0 is not the first LAN ID, the process descends into block 90. In block 90, the process checks to see if L0 is the last LAN ID. If L0 is the last LAN ID, the process descends into block 92. In block 92, the L0 last flag is set to 1 and the process exits at block 94. If L0 is not the last LAN ID (block 90), the process descends into block 100. In block 100, the process checks to see if L1 is the Last LAN ID. If it is, the process enters block 102 where it sets the L1 Last Flag to a 1 and exits to FIG. 6E. If L1 is not the Last LAN ID, the process exits to FIG. 6E.

Figure 6E:
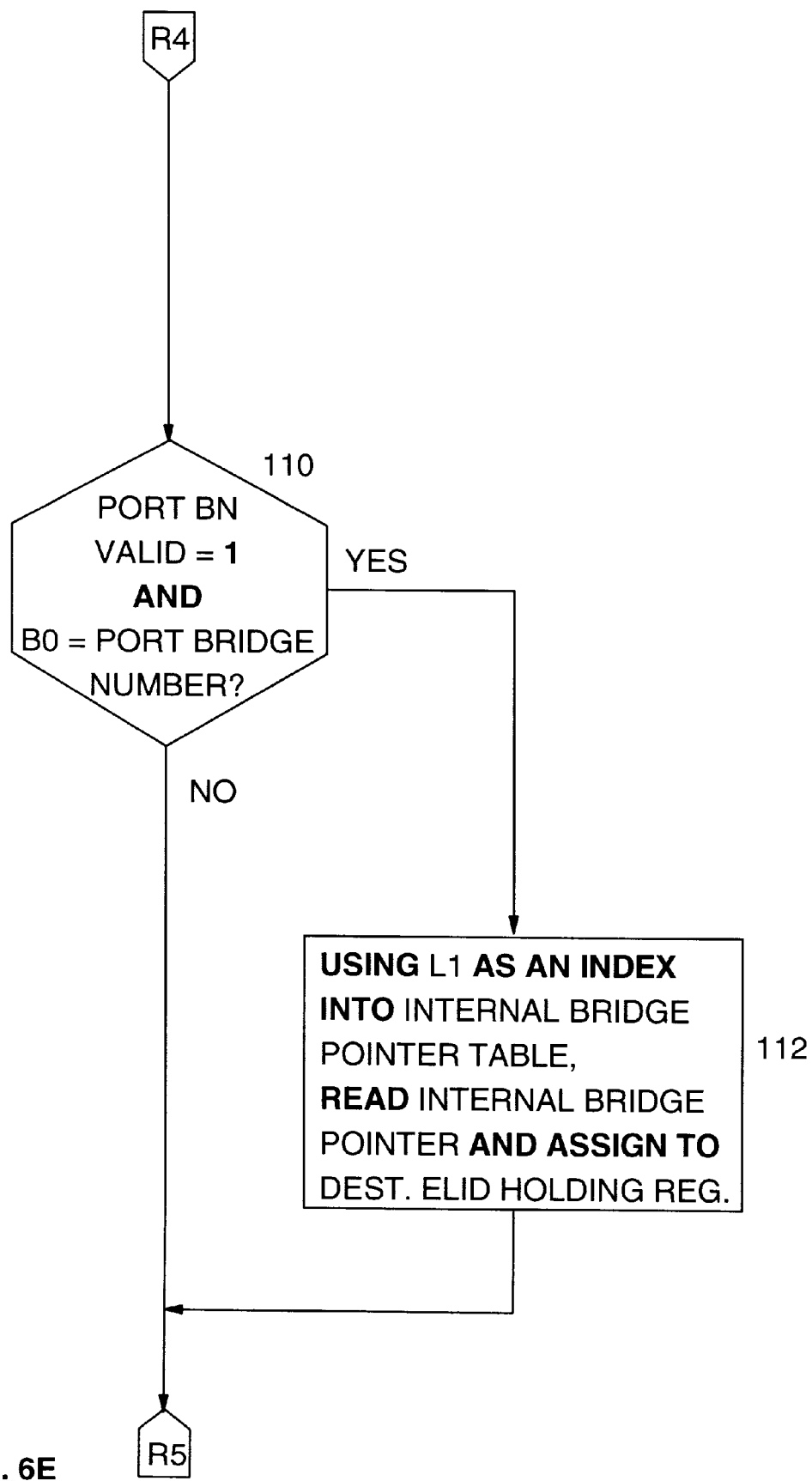

The process enters FIG. 6E at block 110. In block 110, the process checks to see if there is an internal bridge hop in the switch. The criteria for determining if an internal bridge is in the switch is that the Port Bridge Number (BN) is valid; i.e., set for 1, and the $B_0$ is equal to the Port Bridge Number. If these criterion are met, the process descends along the Yes path into block 112. In block 112, the process checks to see if there is part of the internal bridge on LAN ID L-1. If there is not, then the returned Encoded LAN ID (ELID) will match the ports ELID. More particular, in block 112 the process uses the L1 as an index into the Internal Bridge Pointer Table. The information read from the table is stored in the destination Encoded LAN ID (ELID) Holding Register. The process then exits FIG. 6E into FIG. 6F.

Figure 6F:
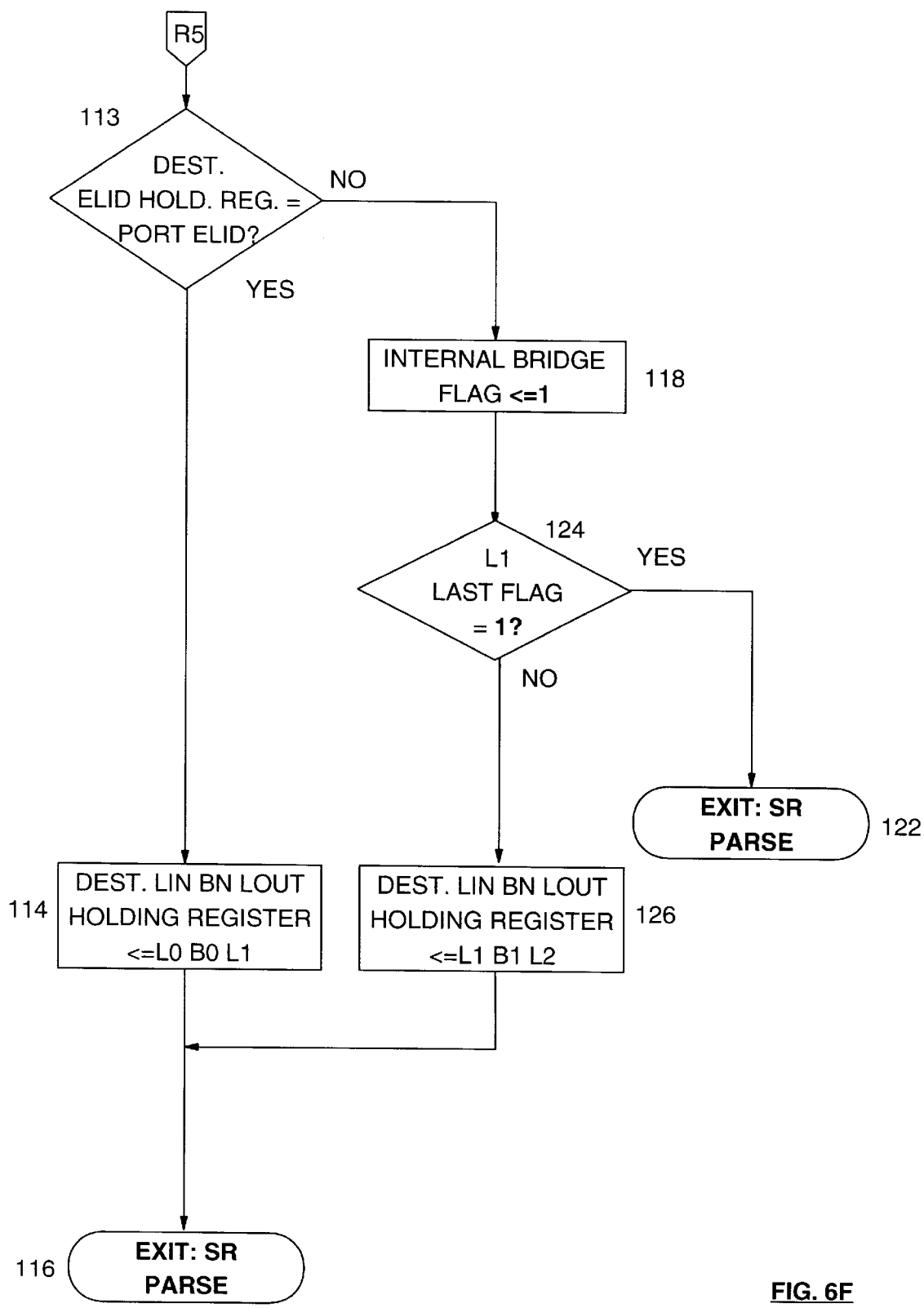

In FIG. 6F, the process checks to see the information in the destination ELID Holding Register equals the information in the Port ELID. If it does, the process descends along the Yes path into block 114 where it sets the Destination Holding Register with the Path Triplet L0 B0 L1 and exits the process in block 116. In essence, block 114 indicates no Internal Bridge Hop. If in block 113, the information in the two registers are different, the process descends into block 118, where it sets the Internal Bridge Flag to a 1 and descends into block 129, where it checks to see if the duplicate L1 flag is set for 1. If it is, the process exits the routine at block 122 and the frame is discarded. If the duplicate L1 flag is not set to 1, the process descends into block 124 where it checks to see if the L1 Last Flag is set for 1. If it is, the process exits through block 122 and a Destination Address search occurs. If in block 124 the L1 Last Flag is not set for 1, the process descends into block 126. In block 126, the process sets the Destination LIN-Bridge Number-LOUT Holding Register to L1 B1 L2 and exits the process in block 116.

The information in block 114 and 126 are used to access the look-up table described above to identify the exit port to which the information is to be routed.

A description of the operation of the invention will now be given. Frames are received from ports in the switch and are tested for a RIF. If the information in the RIF is valid, it is loaded into a Parsing Register, located in the VRAM (FIG. 3).

The Register is always loaded in the same order. The transfer of data from the RIF to the Register is controlled by the setting of the D bit in the RC field (FIG. 4). For example, if D=0 and the information in the RD field is arranged in the pattern L0 B0 L1 B1 L2 B2 L3, the ordering in the RIF Register is L0 B0 L1 B1 L2 L3. If D=1, the RIF Register order is L3 B2 L2 B1 L1 B0 L0. Consequently, the processing of information in the RIF Register is made simpler.

Figure 7A:
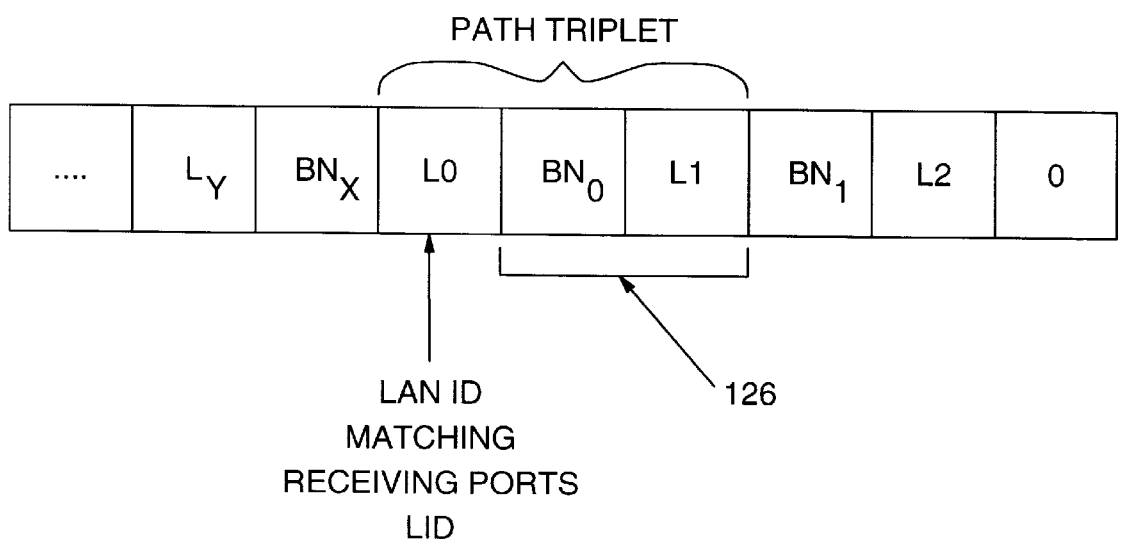
FIG. 7, consisting of FIGS. 7A and 7B, illustrates a graphical representation for parsing the Route Descriptor Field to determine Port of Exit.

Once the information is loaded in the register, it is parsed to determined whether or not the frame should be discarded or forwarded. Turning to FIG. 7A, a graphical representation of parsing is shown. The Path Triplet includes L0-BN0-L1 with L0 being the LAN ID connected to the switch port and matching the LAN ID in the receiving frame. The section of the Path Triplet labeled 126 is termed a Destination Route Descriptor and identifies the next Source Route Bridge Hop that the frame will traverse.

Figure 7B:
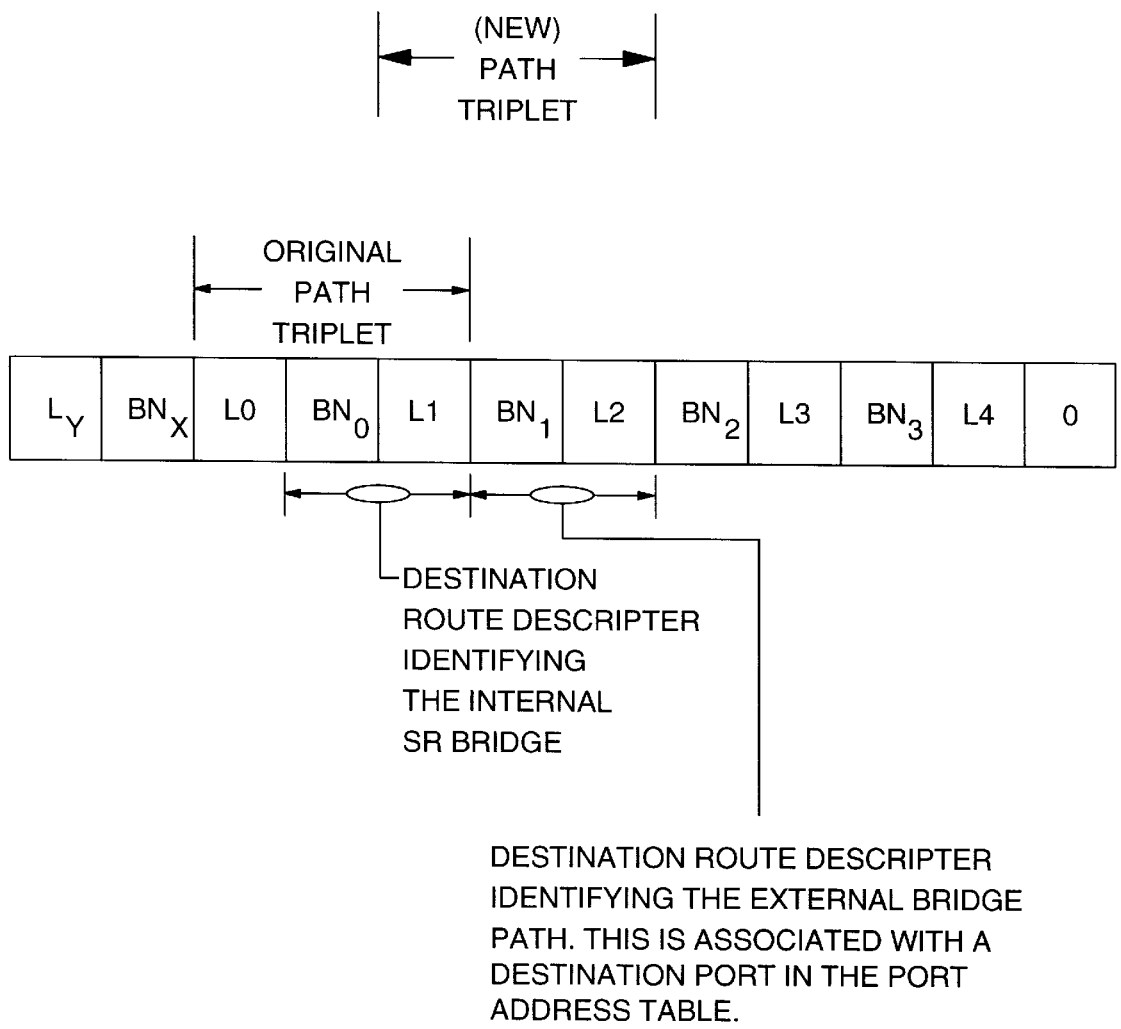

With reference to FIG. 7B, if the next Source Route Bridge Hop is within the switch, a New Path Triplet which overlaps the Original Path Triplet is determined with the respective Descriptors being those identified in FIG. 7B. In the above description of FIGS. 7A and 7 B, D is assumed to be set to 0.

If the next Source Route Bridge Hop is not within the switch, the Destination Route Descriptor would be used to identify the Port of Exit (POE).

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as letters patent is as follows:

We claim:

1. A Token Ring Switch for use to interconnect communications network including:

a switch fabric;

a plurality of ports;

a plurality of port modules interconnecting the plurality of ports to the switch fabric, with at least one of port module including a register for receiving a frame, and at least one look-up table including at least one address for each remote station accessible via another port of the switch along with the target Port of Exit (POE) tag and Bridge Number Lan ID for each remote source route bridge accessible via another port of the switch along with the target POE tag, means for identifying a source routed frame; state machine for analyzing the source routed frame and extracting a first expression identifying an external Source Route Bridge Path from which the frame was received and a second expression identifying an External Source Route Bridge Path for said frame; and state machine for using the first expression or second expression to access the look-up table and identify the Port of Exit (POE) to which the frame is to be routed via the switch fabric.

2. The device of claim 1 wherein a format for the first expression and second expression includes a triplet notation LAN ID-Bridge Number-LAN ID.

3. The device of claim 2 further including means for reversing the order of elements in the triplet notation of $L_0\text{-}B_1\text{-}L_1$ to $L_1\text{-}B_1\text{-}L_0$, where $L_0$ represents a LAN ID, $B_1$ represents a Bridge Number and $L_1$ represents a LAN ID.

4. The Token Ring Switch of claim 1 further including an internal bridge coupled to the switch fabric of said Token Ring Switch.

5. The Token Ring Switch of claim 1 wherein the means includes a Filter Forward State Machine disposed at each port and programmed to perform the respective functions.

6. The Token Ring Switch of claim 5 wherein the Filter Forward State Machine is further programmed to extract a third expression identifying an Internal Source Route Bridge Path.

7. The Token Ring Switch of claim 1 wherein the switch fabric includes a high speed bus.

8. The Token Ring Switch of claim 1 wherein the switch fabric includes a multi-point switching module.

9. The Token Ring Switch of claim 1 further including state machine for generating and concatenating a switch control header to said frame so that the frame can be routed by the switch to the target Port of Exit to which the destination station is connected.

10. The Token Ring Switch of claim 1 further including means for using a Source Address or Destination Address in said frame to access another look-up table to identify the Port of Exit (POE) for said frame if said frame is a non-source routed frame.

11. A method for routing frames through a switch connected to a communications network comprising the steps of:

providing a switch fabric in said switch;

receiving at a port of said switch a frame;

examining the frame;

if the frame has an RI field, determining if $L_0$ (LAN ID) in the frame matches the LAN ID of the port;

if the $L_0$ in the frame matches the LAN ID of the port; using said $L_0$ to determine a first path triplet $L_0$-$BN_0$-$L_1$ with BN representing bridge number;

using $BN_0$-$L_1$ to determine a next bridge hop;

if the next Bridge Hop is within the switch, generating a second path triplet $L_1$-$BN_1$-$L_2$; and using the second expression to access a look-up table from which a Port of Exit for said Frame is read.

12. The method of claim 11 wherein if the second bridge hop is not within the switch, using the first path triplet to identify the Port of Exit to which the frame is to be routed through the switch.

13. The method of claims 11 or 12 wherein only portions of the first path triplet or second path triplet is used to identify a Port of Exit.

14. A Token Ring Switch for use to interconnect communications network including:

a switch fabric;

a plurality of ports;

a plurality of port modules interconnecting the plurality of ports to the switch fabric, with each one of the plurality of port modules including a register for receiving a frame, port table that stores information including target Port of Exit through which a frame has to be routed to reach a destination station and at least one Function State Machine with the program logic to filter frames that do not need to traverse the switch to reach a Port of Exit to a destination, to parse a frame received from the port to which it is connected to extract information that is used to access the table and read the target POE, to place a Switch Control Header in selected frame received so that the frame can be routed to the specific POE to which a destination station is connected, and to update the statistics associated with the frame.

* * * * *